United States Patent
Winefordner et al.

(10) Patent No.: US 10,464,631 B2
(45) Date of Patent: Nov. 5, 2019

(54) AUTOMATIC BICYCLE PEDAL

(71) Applicant: Selle Royal S.p.A., Pozzoleone (Vicenza) (IT)

(72) Inventors: Carl Winefordner, Laguna Beach, CA (US); Frank Hermansen, Laguna Beach, CA (US); Mark Rane, Laguna Beach, CA (US)

(73) Assignee: SELLE ROYAL S.P.A., Pozzoleone (Vicenza) (IT)

( * ) Notice: Subject to any disclaimer, the term of this patent is extended or adjusted under 35 U.S.C. 154(b) by 0 days.

(21) Appl. No.: 16/143,899

(22) Filed: Sep. 27, 2018

(65) Prior Publication Data

US 2019/0023350 A1 Jan. 24, 2019

Related U.S. Application Data

(62) Division of application No. 15/312,861, filed as application No. PCT/IB2015/053562 on May 14, 2015.

(30) Foreign Application Priority Data

May 19, 2014 (IT) .......................... VR2014A000138

(51) Int. Cl.
*B62M 3/08* (2006.01)

(52) U.S. Cl.
CPC .................. *B62M 3/086* (2013.01)

(58) Field of Classification Search
CPC ........ B62M 3/08; B62M 3/083; B62M 3/086; Y10T 74/2168; Y10T 74/217
See application file for complete search history.

(56) References Cited

U.S. PATENT DOCUMENTS

| 5,105,683 | A | | 4/1992 | Mercat et al. |
| 5,381,708 | A | | 1/1995 | Liao |
| 5,442,976 | A | * | 8/1995 | Cheng .................... B62M 3/086 36/131 |
| 5,634,383 | A | * | 6/1997 | Lin ........................ B62M 3/086 74/594.6 |
| 6,474,194 | B1 | | 11/2002 | Peyre |
| 6,564,676 | B2 | | 5/2003 | Bezet |
| 6,729,204 | B1 | | 5/2004 | Chen et al. |
| 8,646,359 | B2 | | 2/2014 | Hsieh et al. |

(Continued)

FOREIGN PATENT DOCUMENTS

| EP | 2706004 | | 12/2014 | |
| FR | 2695902 A1 | * | 3/1994 | ............ B62M 3/086 |
| WO | 2011/111222 | | 9/2011 | |

OTHER PUBLICATIONS

Machine Translation of FR 2695902, obtained Sep. 17, 2018.*
Machine Translation of WO 2011/111222, obtained Jun. 19, 2019.*

*Primary Examiner* — Richard W Ridley
*Assistant Examiner* — Brian J McGovern
(74) *Attorney, Agent, or Firm* — Tutunjian & Bitetto, P.C.

(57) ABSTRACT

An automatic bicycle pedal, including a pedal body rotationally connected to a spindle suitable to be coupled to a pedal crank, said pedal body having a front-rear direction (A) and including a front portion and a rear portion which are engageable by a cleat, said cleat being connectable to the sole of a rider's shoe and including a front hook and a rear hook; the front portion includes flexible engagement means for said front hook of said cleat.

4 Claims, 11 Drawing Sheets

(56) References Cited

U.S. PATENT DOCUMENTS

| | | | |
|---|---|---|---|
| 2004/0187636 A1* | 9/2004 | Hsiao | B62M 3/086 74/594.6 |
| 2006/0053963 A1* | 3/2006 | Xie | B62M 3/086 74/594.6 |
| 2011/0048166 A1* | 3/2011 | Lin | B62M 3/086 74/594.6 |
| 2012/0067165 A1 | 3/2012 | Bouchez et al. | |
| 2014/0060245 A1* | 3/2014 | Morelli | B62M 3/086 74/594.6 |

* cited by examiner

AUTOMATIC BICYCLE PEDAL

CROSS-REFERENCE TO RELATED APPLICATIONS

This is a division of application Ser. No. 15/312,861 filed Nov. 21, 2016 which claims priority from Italian Application No. VR2014A000138 filed on May 19, 2014, the disclosures of which are incorporated herein by reference.

TECHNICAL FIELD OF THE INVENTION

The present invention relates to an automatic bicycle pedal.

STATE OF THE ART

Automatic bicycle pedals conventionally comprise a pedal body provided, at the front and the rear, with attachment means used to hold a cleat that is fixed to the sole of a shoe.

Such pedals originally had a relatively high number of component parts.

Thus, in addition to the pedal body, they would comprise a cartridge spindle assembly, for mounting on a pedal crank, comprising a spindle, rings, rolling bearings, etc., and on which the pedal body was mounted such that it could rotate, a rear lever articulated to the body about a pivot axis, and an elastic system for preloading the lever, such as shown in U.S. Pat. No. 6,564,676.

For example, the elastic system could be produced from a metallic or elastomer spring, or a blade working in bending or in buckling, etc.

One of the problems caused by the rear articulated lever—in addition to its structural complexity—is that as the rider pulls rearward during the pedal stroke, the rear articulated lever springs open causing the cleat to slide rearward enough to cause pedaling inefficiency and cleat/pedal wear.

In extreme cases, or when the pedal force is adjusted too low, the cleat can slide far enough backwards that the front disengages, causing the rider's foot to suddenly pull out of the pedal.

Some known pedal bodies—such those disclosed, for example, in US 2012/0067165, U.S. Pat. No. 5,381,708, and U.S. Pat. No. 5,105,683—have a flexible rear lever instead of a rear lever that articulates about a spring loaded pivot axis.

These pedals reduce the number of components and weight, but do not provide a means for adjusting the cleat release and are not weight biased to hang with the rear downwards, making engagement more difficult because the pedal can sometimes be oriented in a position that makes engagement impossible without first repositioning the pedal itself.

The majority of existing automatic pedals require a step in and down motion to engage and a twist to release, and this is so common that most riders are accustomed to this motion.

Furthermore, different riders prefer differing amounts of release force.

Presently, in existing pedals that have a release adjustment, as the release force is increased, the force of cleat engagement is also increased.

When riders adjust cleat force higher, it is usually because they want to prevent accidental release and they want an extremely obvious limit to rotational float; in addition, they want to be highly aware of when they are beginning to release.

However, the same riders do not want a more difficult entry.

In existing pedals having a rear attachment means, yet the cleat is engaged by stepping forward into the front of the pedal body and then downward, causing the rear attachment means to move backwards.

The forward motion of the cleat does not directly assist the engagement, and instead it is the downward movement that actually causes engagement.

The expression "rotational float" refers to rotational movement between the cleat and the body while remaining engaged.

Rotational float is typically measured in degrees, and in automatic pedals can vary from as little as zero—also known as "fixed"—to as much as 30 degrees, although 5 to 10 degrees is most typical.

The rotational float can usually be adjusted either by using a different cleat or by adjusting a mechanism foreseen within the cleat.

SUMMARY OF THE INVENTION

The technical aim of the present invention is therefore to improve the state of the art.

Within such technical aim it is an object of the invention to develop an automatic bicycle pedal having simplified structural features and reduced manufacturing cost.

Another object of the invention is to propose an automatic bicycle pedal having reduced weight.

A further object of the invention is to develop an automatic bicycle pedal having improved clipping of the foot into the pedal body while offering independent adjustment for release.

Still another object of the present invention is to provide an automatic bicycle pedal in which the cleat's forward motion directly causes the engagement means to open.

This aim and these objects are all achieved by the automatic bicycle pedal according to the present invention.

Furthermore, this aim and there objects are all achieved by a cleat according to the present invention.

The automatic bicycle pedal according to the invention comprises a pedal body rotationally connected to a spindle suitable to be coupled to a pedal crank.

The pedal body defines a front-rear direction and comprises a front portion and a rear portion which are engageable by a cleat, connectable to the sole of a rider's shoe and comprising a front hook and a rear hook.

The front portion of the pedal body comprises flexible engagement means for the front hook of the cleat.

The flexible engagement means provided in the front portion of the pedal body determines the amount of engagement force of the cleat into the pedal body, such engagement force being totally independent from the release force.

According to the present invention, the rear portion if the pedal body comprises a latch member which is selectively slidable within a respective seat along the front-rear direction of the pedal body.

The relative position of the latch member, along the front-rear direction of the pedal body, with respect to the rear portion of the pedal body itself, determines the amount of release force of the cleat by the pedal body, which is totally independent from the engagement force.

According to the present invention, the latch member comprises an external surface having a ramp profile suitable to engage a respective groove of the rear hook of the cleat.

The cleat according to the invention, connectable to the sole of a rider's shoe, is provided with a front hook and a rear hook respectively engageable in a front portion and in a rear portion of the pedal body; the rear hook of the cleat comprises two protrusions among which such groove is defined.

The present specification refers to preferred and advantageous embodiments of the invention.

BRIEF DESCRIPTION OF THE DRAWINGS

These and other advantages will be better understood by any man skilled in the art from the following description that follows and from the attached drawings, given as a non-limiting example, in which.

DETAILED DESCRIPTION OF THE INVENTION

Figure 1:
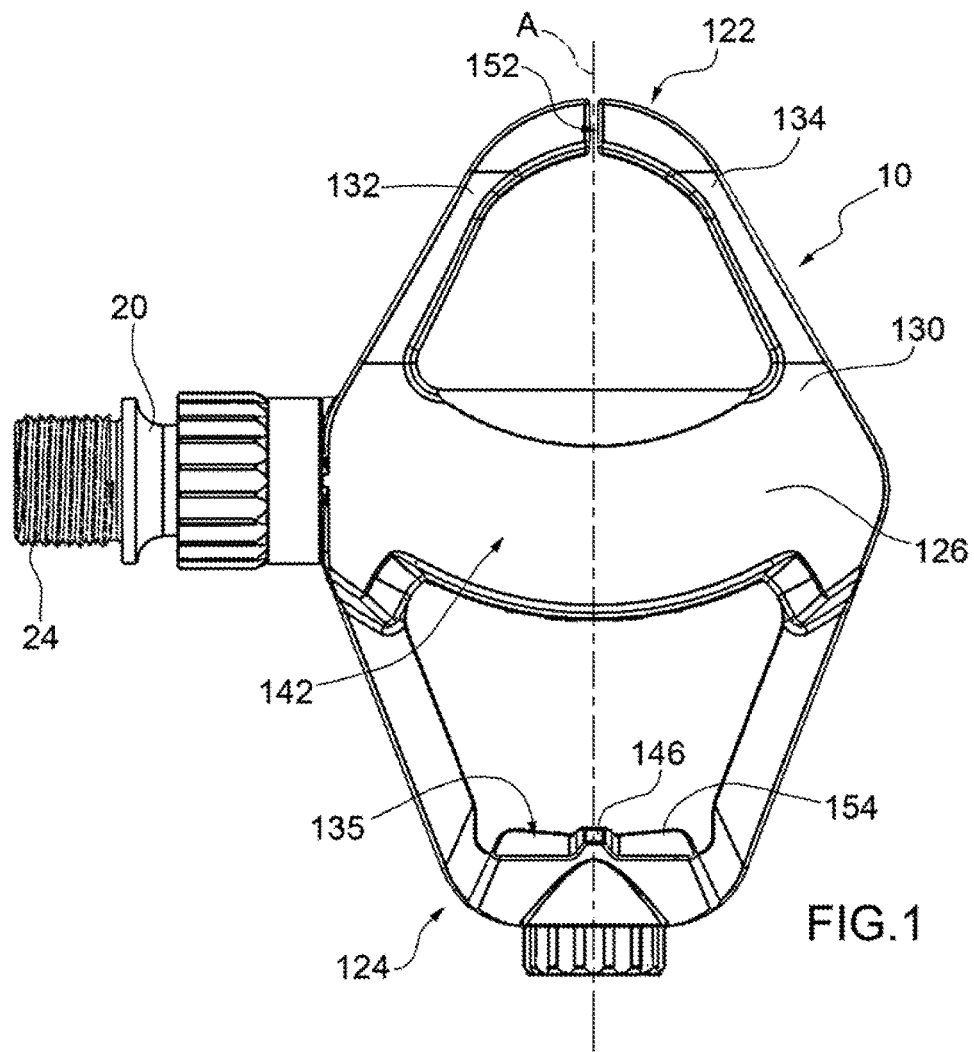
FIG. 1 is a top view of the automatic pedal according to the invention.
Figure 2:
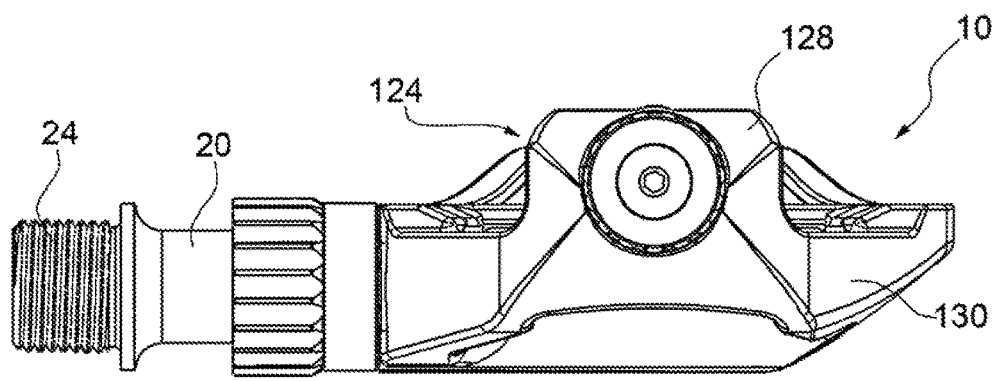
FIG. 2 is a rear view of the pedal.
Figure 3:
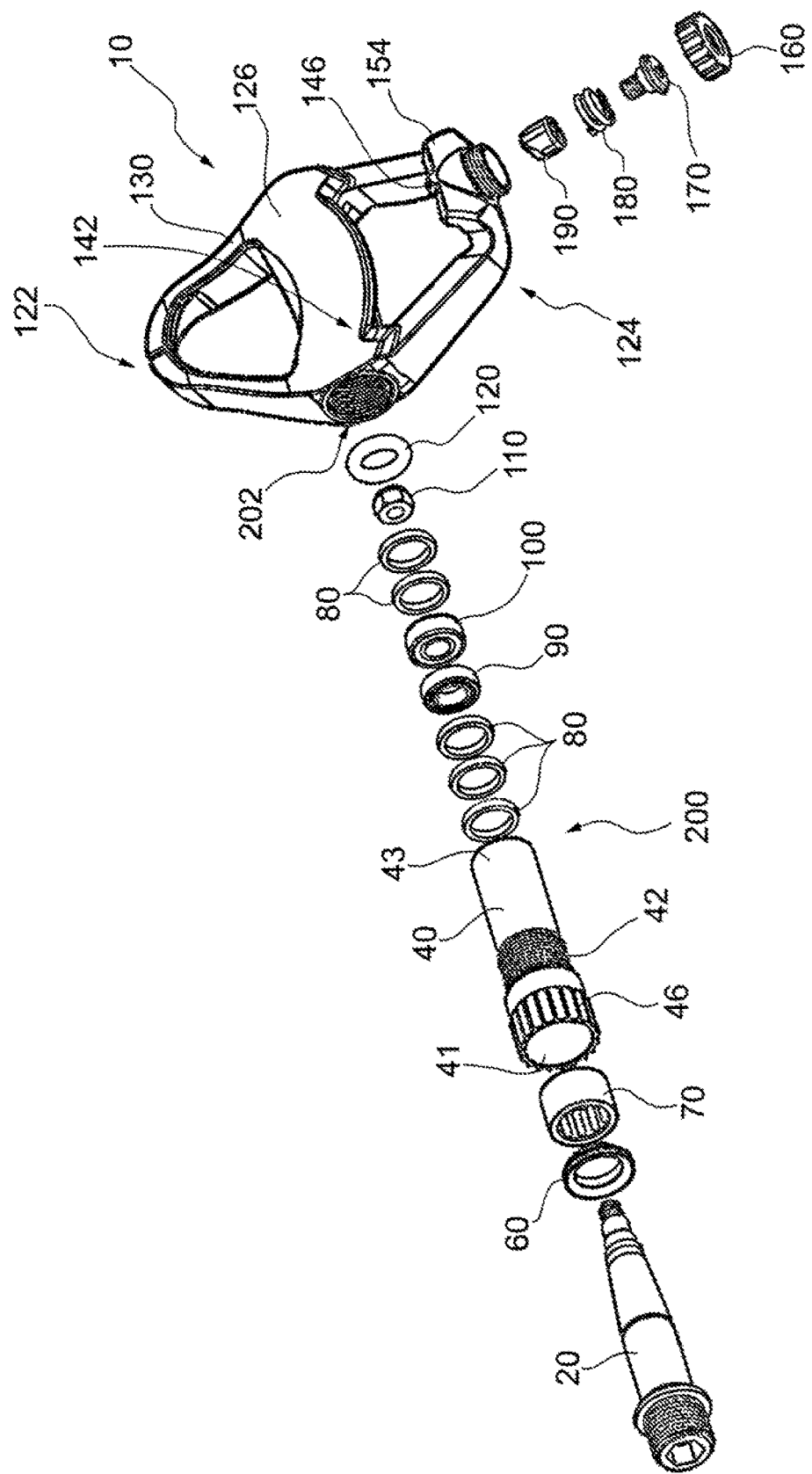
FIG. 3 is an exploded view of the pedal.
Figure 4:
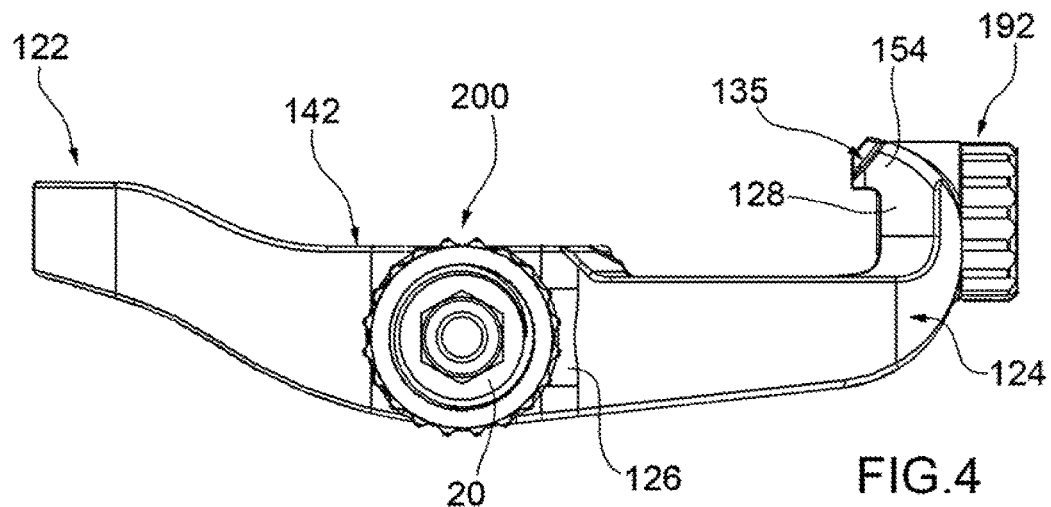
FIG. 4 is a side view of the pedal.

With reference to the schematic representation of FIG. 1, an automatic bicycle pedal according to the invention is wholly indicated with 10.

In the following embodiments individual characteristics, given in connection with specific embodiments, may actually be interchanged with other different characteristics that exist in other embodiments.

The automatic pedal according to the present invention can be easily installed on bicycles of any kind; preferably, but not exclusively, the pedal according to the invention is installed on road bicycles and the like.

The pedal 10 comprises a pedal body 130.

The pedal body 130 is rotationally connected to a spindle 20; the spindle 20 suitable to be coupled to a pedal crank.

The spindle's 20 shape shown is smooth and tapered over the majority of the length, in order to minimize stress risers.

Spindle 20 can be made of titanium, or other suitable material.

The pedal body 130 can be made from any material suitable for the application.

For example, it can be made of polymeric material.

One preferred material could be a carbon reinforced polymer.

The pedal body 130 has, or defines, a front-rear direction A.

The pedal body 130 comprises a front portion 122 and a rear portion 124.

The pedal body 130 further comprises a central portion 126.

The central portion 126 defines an upper surface 142, suitable to contact the cleat 220.

The rear portion 124 of the pedal body 130 comprises an appendix 128.

The appendix 128 is substantially perpendicular to the front-rear direction A of the pedal body 130.

The spindle 20 comprises a threaded extremity 24 for connection to the crank arm.

The spindle 20 is connected to the pedal body 130 by means of a cartridge assembly 200.

Figure 8:
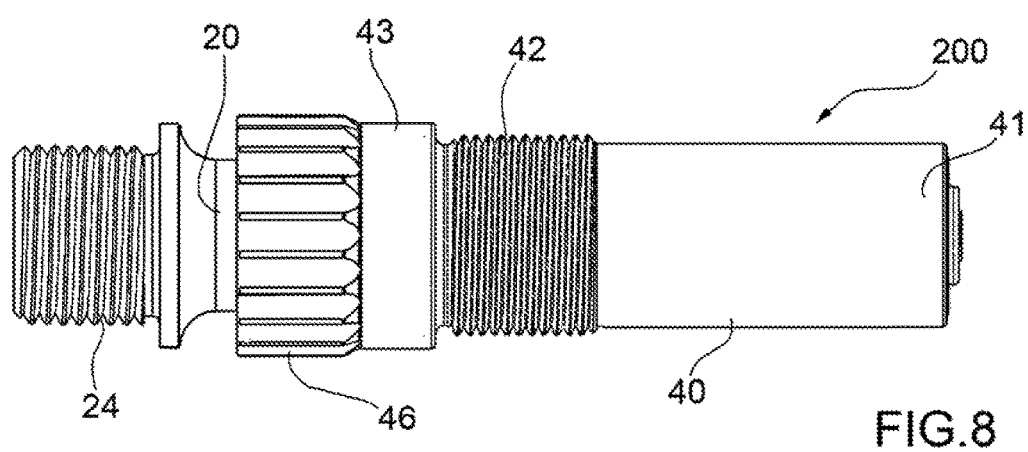
FIG. 8 is a top view of the cartridge assembly of the pedal.
Figure 9:
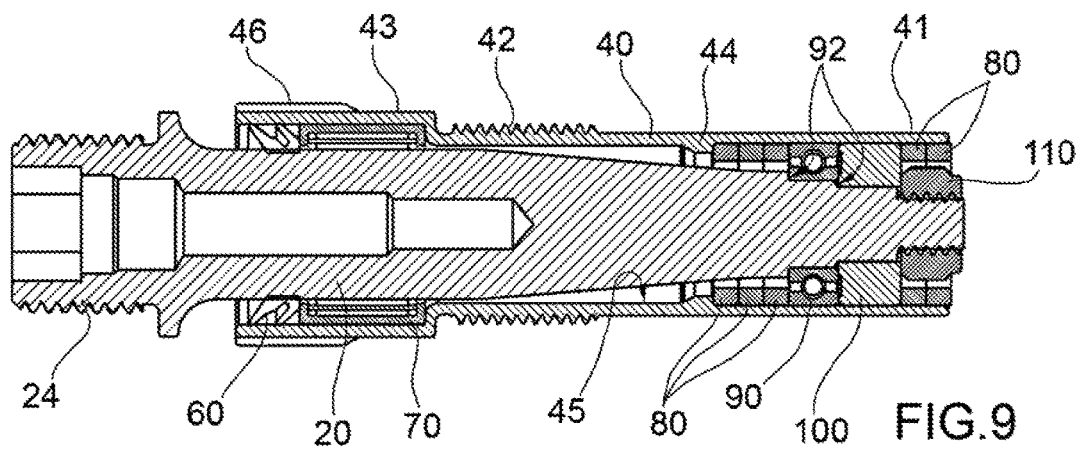
FIG. 9 is a sectional view of the spindle cartridge of the pedal with the Q-factor in a mid position.

The cartridge assembly is shown in detail in FIGS. 8 and 9.

The cartridge assembly 200 is housed inside a cylindrical seat 202 provided in the central portion 126 of the pedal body 130.

The cylindrical seat 202 comprises a threaded end 136.

The cartridge assembly 200 comprises a cartridge body 40.

The cartridge body 40 has substantially tubular shape, and it comprises a first end 41 and a second end 43.

The cartridge body 40 can be made of aluminum, or any other suitable material.

The first end 41 comprises a spline 46; between the first end 41 and a second end 43 a thread portion 42 is foreseen.

The thread portion 42 is screwed in the threaded end 136 of the cylindrical seat 202, in order to safely connect the cartridge body 40 to the central portion 126 of the pedal body 130.

The spline 46 allows the cartridge body 40 to be easily screwed into the pedal body 130.

The cartridge assembly 200 comprises a first bearing 70 of the needle type, which rotationally supports the spindle 20 by a first end of the cartridge body 40.

A needle bearing 70 is preferred for strength and durability; the needle bearing 70 could be replaced by a bushing.

A seal 60 abuts onto the needle bearing 70, and it closes the cartridge body 40 opening, preventing contamination from entering the cartridge body 40 itself. The spindle 20 is rotationally supported, by a second end of the cartridge body 40, by a second bearing 90 and by a third bearing 100.

Two bearings 90,100 are preferred for strength and durability: however they could be replaced by a single bearing or bushing.

The bearings 90,100 are arranged on abutments 92 foreseen in the spindle 20, and they are held by a nut 110 screwed onto the threaded end of the spindle 20. Into the cylindrical seat 202 an O-ring seal 120 is housed, on which the second end 43 of the cartridge body 40 abuts.

The inner surface 45 of the cartridge body 40 comprises a lip 44.

A plurality of spacers 80 are interposed between the lip 44 and the second bearing 90, and between the third bearing 100 and the O-ring seal 120.

In the embodiment of the invention shown in the figures, the spacers 80 are in number of five; the number of spacers 80 could be any, in order to satisfy specific requirements.

The spacers 80 can be made of aluminum, or any other suitable material.

The spacers 80 can be relocated in order to modify the so called "Q-factor" of the pedal 10, which is the distance between the centers of the rider's feet, or more in particular the distance from the centerline of the cleat to the bicycle crank arm.

The thickness of the spacers 80 can be any, for example 1 mm or 2 mm.

Figure 5:
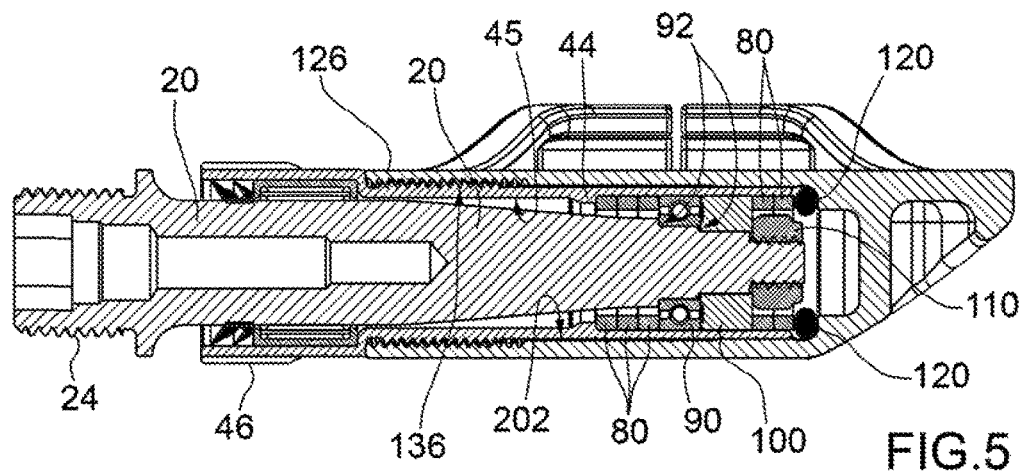
FIG. 5 is a sectional view of the pedal with the spindle cartridge installed with the Q-factor in a mid position.
Figure 6:
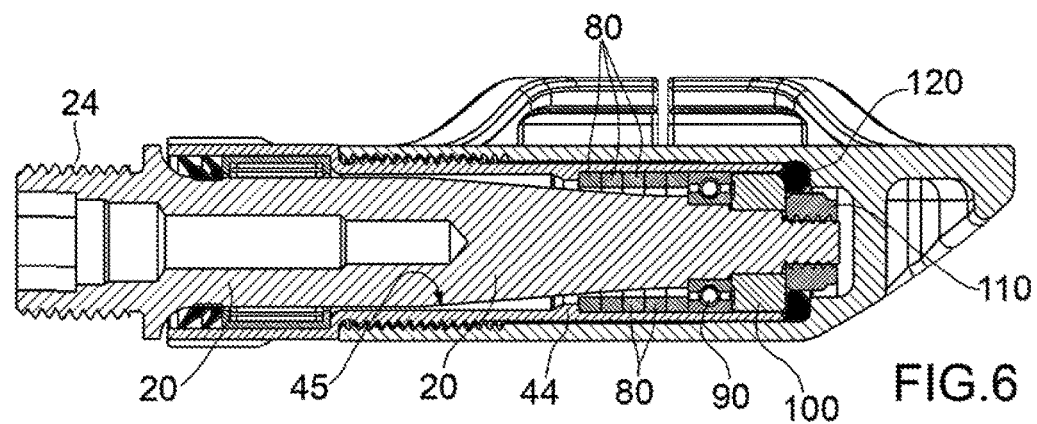
FIG. 6 is a sectional view of the pedal with the spindle cartridge installed with the Q-factor in the minimized position.
Figure 7:
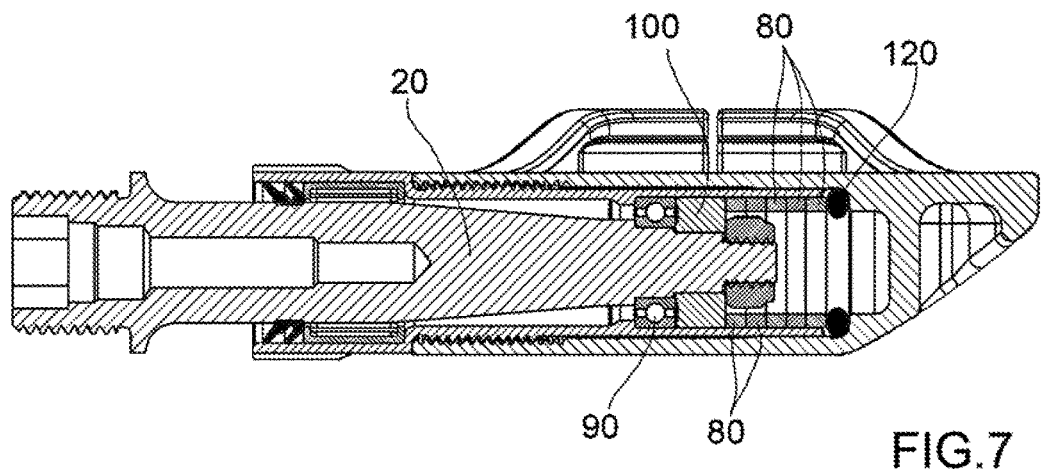
FIG. 7 is a sectional view of the pedal with the spindle cartridge installed with the Q-factor in the maximized position.

For example, three possible configurations of the cartridge assembly 200, corresponding to three different Q-factors of the pedal 10, are respectively shown in FIGS. 5, 6, 7.

In FIG. 5 a first configuration is shown, corresponding to a certain Q-factor value, where three spacers 80 are arranged, along the spindle 20, between the lip 44 and the first bearing 90, while two spacers 80 are arranged between the second bearing 100 and the O-ring seal 120.

In FIG. 6 is shown a configuration corresponding to the minimum Q-factor value of the pedal 10.

In this configuration, all the spacers 80 are arranged, along the spindle 20, between the lip 44 and the first bearing 90.

In FIG. 7 is shown a configuration corresponding to the maximum Q-factor value of the pedal 10.

In this configuration, all the spacers 80 are arranged, along the spindle 20, between the second bearing 100 and the O-ring seal 120.

Many other intermediate configurations can be achieved by simply removing the cartridge body 40 from the cylindrical seat 202, and the nut 110 from the threaded end of the spindle 20, in order to remove the bearings 90,100 and to relocate the spacers 80 according to the desired Q-factor.

A spindle cartridge assembly 200 is preferred for convenience of changing the Q-factor, but it would be possible to assemble the spindle 20, bearings 70, 90, 100, spacers 80 and nut 110 directly inside the cylindrical seat 202 of the pedal body 130.

The front portion 122 and the rear portion 124 of the pedal body 130 are engageable by a cleat 220.

The cleat 220 is connectable to the sole of a rider's shoe.

Figure 13:
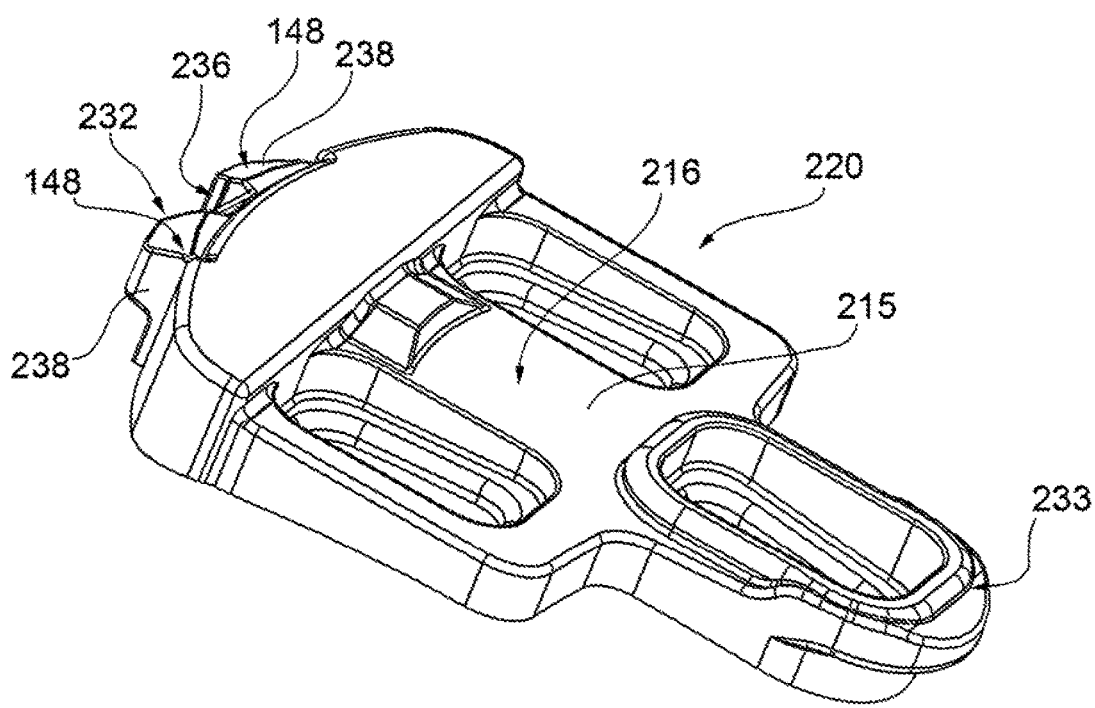
FIG. 13 is a perspective view of the bottom of the cleat engageable in the pedal according to the invention.
Figure 14:
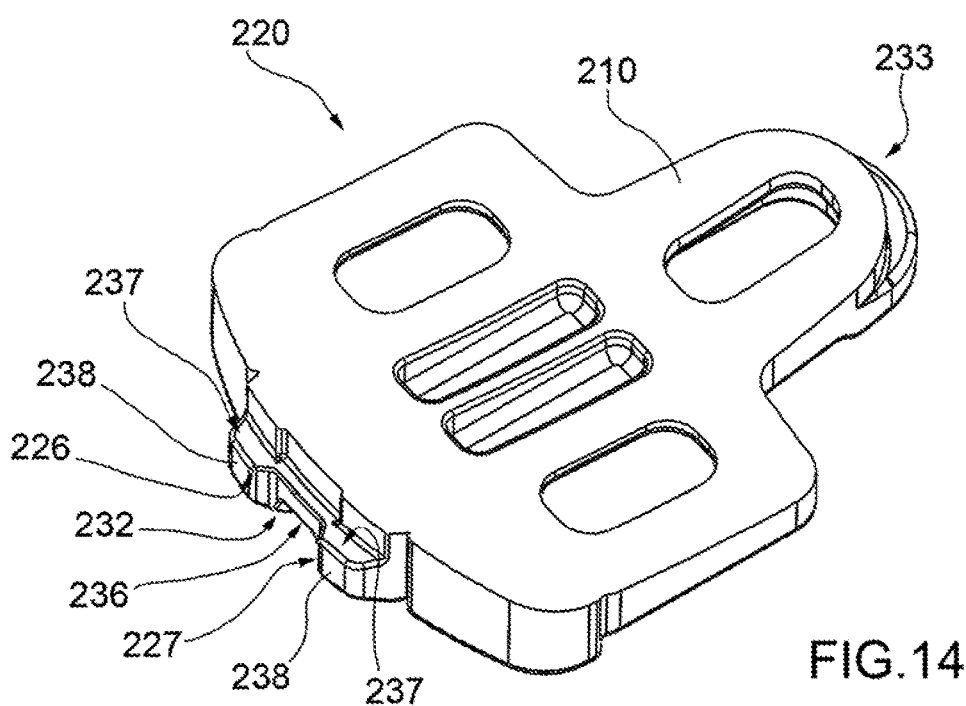
FIG. 14 is a perspective view of the top of the cleat.

The cleat 220 is shown in detail in FIGS. 13, 14; the present invention also relates to such cleat 220.

The cleat 220 comprises an upper region 210—visible in FIG. 14—for connection to the rider's sole (not shown), and a lower region 215—visible in FIG. 13—having a lower surface 216 suitable to abut on the upper surface 142 of the pedal body 130.

Figure 15:
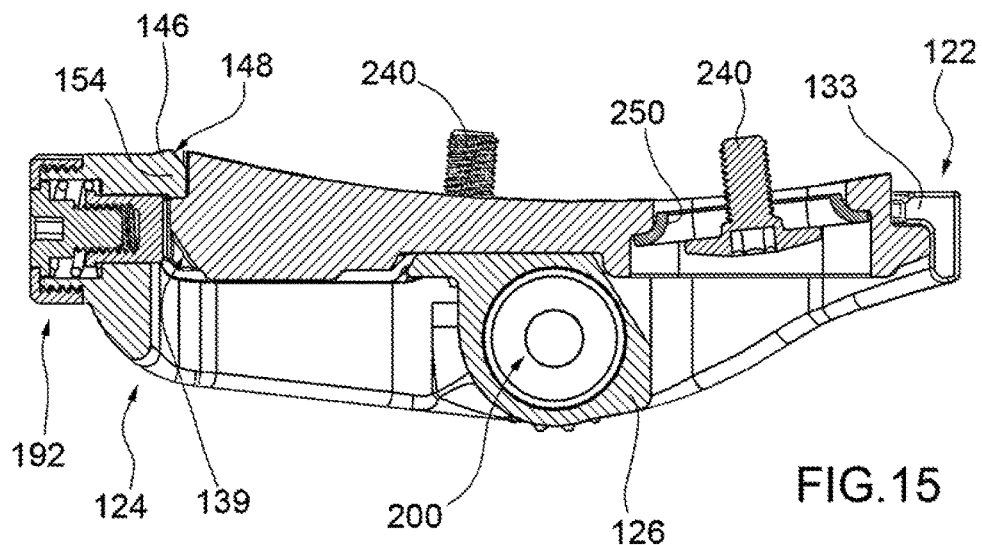
FIG. 15 is a sectional view of the pedal with the cleat fully engaged into it.
Figure 16:
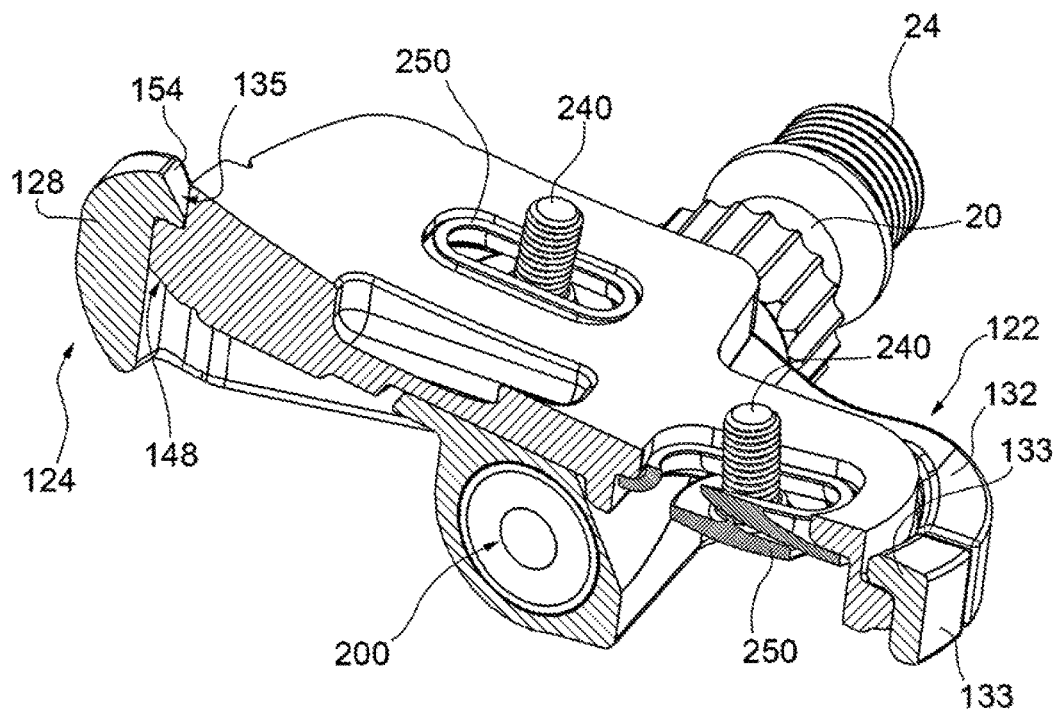
FIG. 16 is a perspective sectional view of the pedal with the cleat fully engaged into it.

The connection to the sole—which is standard and adjustable—is achieved by screws 240 passing through washers 250, see for example FIGS. 15, 16.

The cleat 220 comprises a front hook 233 and a rear hook 232.

According to an aspect of the present invention, the front portion 122 of the pedal body 130 comprises flexible engagement means 132,134 for the front hook 233 of the cleat 220.

More in detail, the flexible engagement means 132,134 comprise a first flexible leg 132.

The flexible engagement means 132,134 further comprise a second flexible leg 134.

The first flexible leg 132 and the second flexible leg 134 are separated by a gap 152.

The gap 152 is preferably, but not exclusively arranged along the front-rear direction A of the pedal body 130.

Anyway, the gap 152 could be arranged along a different direction, according to specific embodiments of the invention.

In other embodiments of the invention, not shown, the flexible engagement means 132,134 can comprise a single leg wrapping around the front hook 233 of the cleat 220.

In other embodiments, the flexible engagement means 132,134 can comprise one or more hinged and spring loaded legs instead of flexible legs.

The width of the gap 152 can be any suitable to ensure safe engagement of the front hook of the cleat 220 and quick and easy disengagement of the latter.

Such width of the gap 152 could be modified according to specific user's requirements, and in order to achieve different engagement forces of the cleat 220 into the pedal body 130.

The first flexible leg 132 and the second flexible leg 134 are both substantially arc-shaped; in other embodiments of the invention, their shape could be any suitable for specific requirements.

The first flexible leg 132 and the second flexible leg 134 have a cross section that is taller than wide.

Thanks to this feature, the legs 132,134 are easily flexible forwards and outwards to accept the cleat 220.

Furthermore, the legs 132,134 are stiff upwards to create a rigid connection between the cleat 220 and the pedal body 130.

The legs 132,134 have a substantially L-shaped cross-section, at least around the gap 152 area.

Therefore, each of legs 132,134 defines an internal edge 133.

An advantage of the flexible engagement means 132,134 being in the front portion 122 of the pedal body 130 is that the cleat 220 sliding forward directly and gradually contributes to the engagement means 132,134 to flex apart, making it easier to engage the pedal 10 with rear engagement means.

Separate springs and/or pivot pins, which characterize automatic pedals of the known kind, are thus eliminated allowing for a lighter, simpler and less expensive automatic pedal.

In addition, thanks to this feature the pedal 10 has a rear weight bias to hang downward when not engaged.

According to another aspect of the invention, the rear portion 124 of the pedal body 130 comprises a latch member 190.

Figure 10:
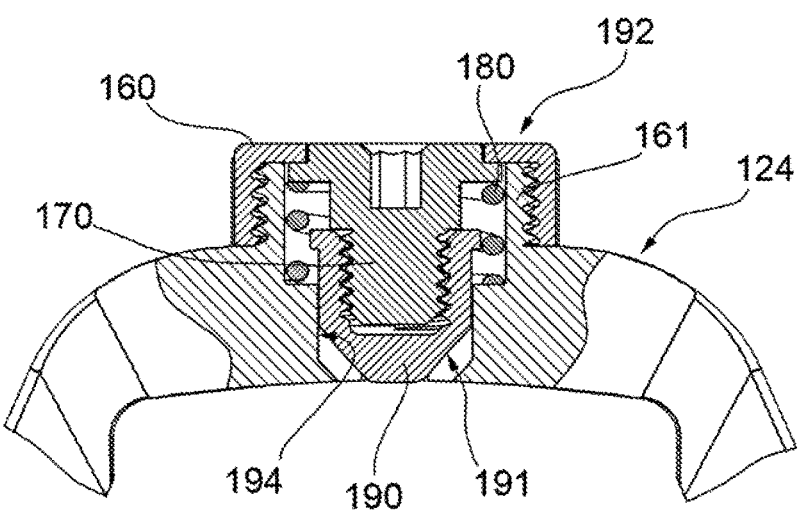
FIG. 10 is a close up sectional view of the rear of the pedal with the ramp fully retracted, to achieve the easiest cleat release configuration.
Figure 11:
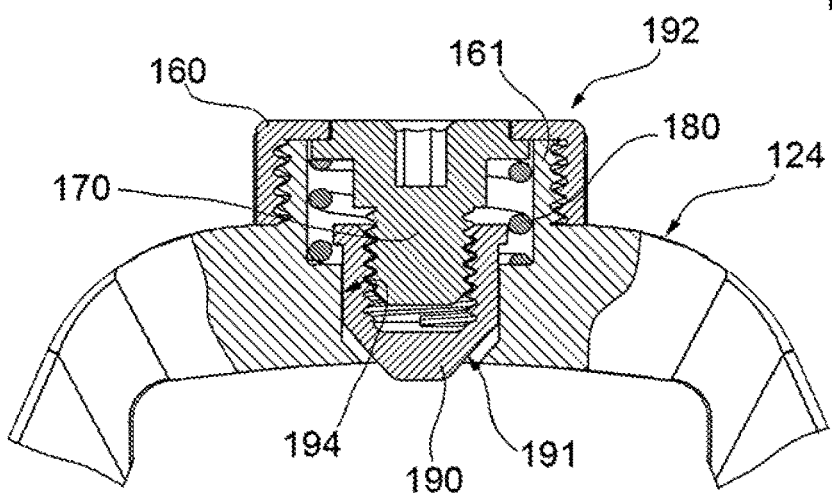
FIG. 11 is a close up sectional view of the rear of the pedal with the ramp partially extended, to achieve a medium amount of cleat release force.
Figure 12:
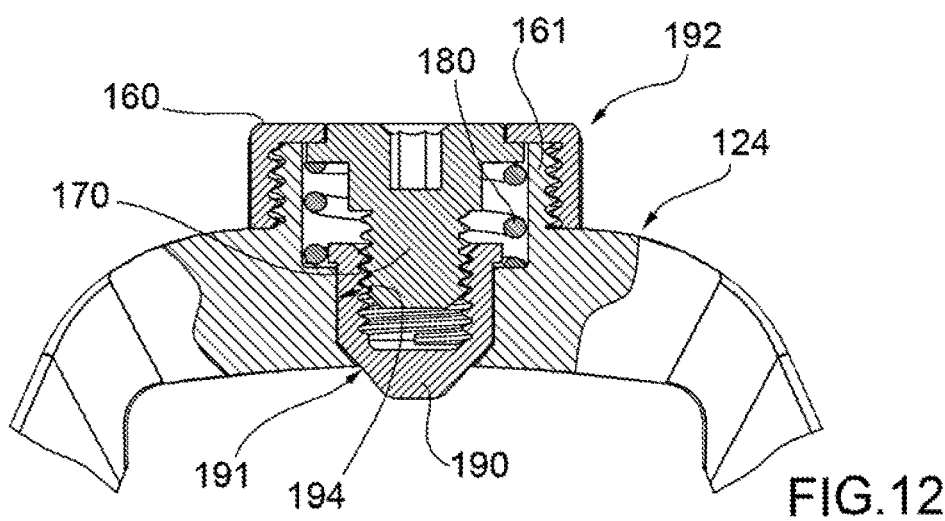
FIG. 12 is a close up sectional view of the rear of the pedal with the ramp fully extended, to achieve the highest amount of cleat release force.

The latch member 190 is shown, in particular, in FIGS. 10, 11, 12.

The latch member 190 is selectively slidable, along the front-rear direction A, within a respective seat 194 provided in the appendix 128 of the rear portion 124.

More in detail, the latch member 190 comprises an external surface 191.

The external surface 191 of the latch member 190 has a ramp profile.

According to a further aspect of the invention, the latch member 190 comprises screw adjusting means 192.

The screw adjusting means 192 comprise a screw 170 engaged in the latch member 190.

The screw 170 is retained in the seat 194 by a ring 160.

The ring 160 is screwed onto a nut 161, which is integral with the rear portion 124 of the pedal body 130.

Furthermore, the screw adjusting means 192 comprise a spring 180.

The spring 180 holds the screw 170 against the ring 160.

The contact annular surfaces between the screw 170 and the ring 160 may be provided with detent means, in order to index the screw 170 at periodic positions.

The appendix 128 of the rear portion 124 comprises a rear edge 154.

The rear edge 154 defines a first angled surface 135.

The rear edge 154 further comprises a rear tooth 146.

The rear tooth 146 defines a second angled surface 138.

The first angled surface 135 and the second angled surface 138 have the same inclination, but in certain embodiments of the invention they may have different inclinations.

The rear hook 232 of the cleat 220 comprises a groove 236.

More in detail, the rear hook 232 comprises two protrusions 238, among which the groove 236 is defined.

The groove 236 defines a third angled surface 139.

The protrusions 238 define respective engagement surfaces 237, which are substantially parallel to the lower surface 216 of the cleat 220.

The protrusions 238 define respective fourth angled surfaces 148, and respective lateral angled surfaces 226,227.

The front hook 233 of the cleat 220 comprises a front edge 234.

Figure 17:
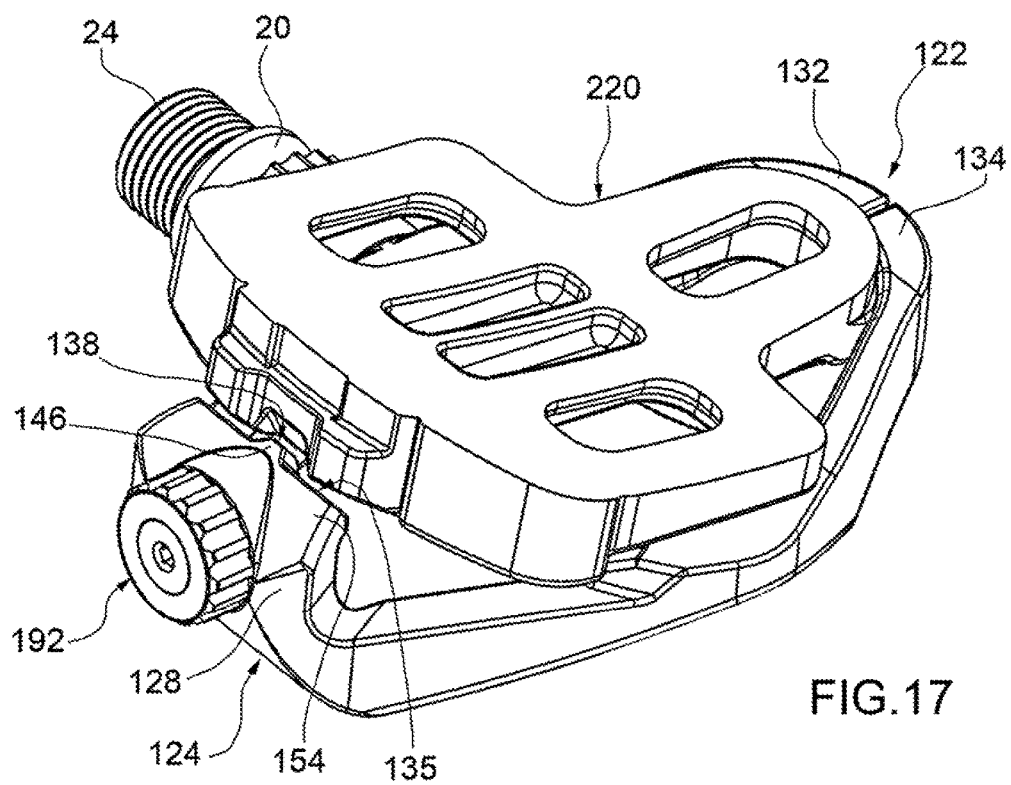
FIG. 17 is a perspective view of the pedal with the cleat ready to be engaged into it.
Figure 18:
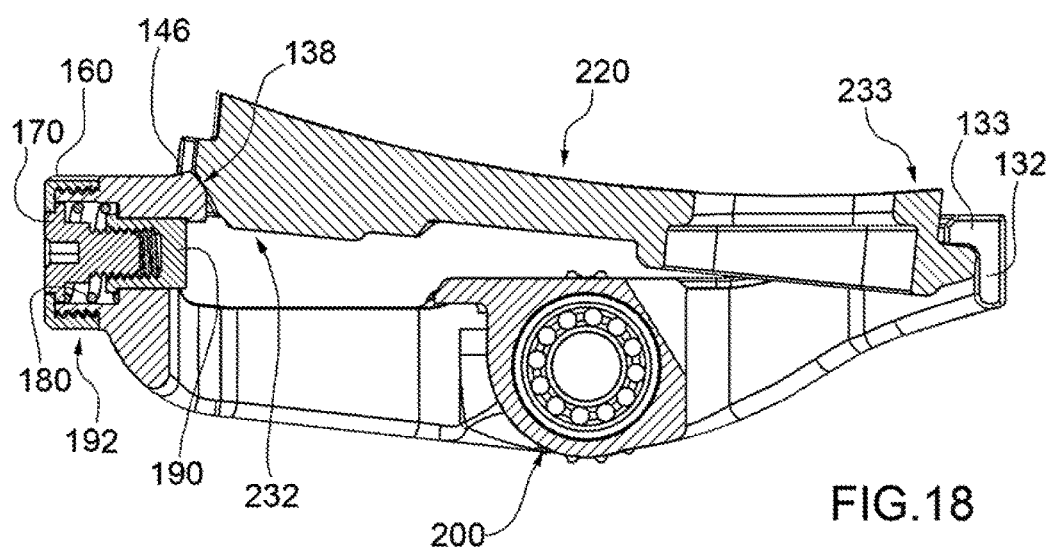
FIG. 18 is a sectional view of the pedal with the cleat ready to be engaged into it.

During engagement of the cleat 220 into the pedal body 130—see FIGS. 17, 18—the front edge 234 of the cleat 220 is engaged under the internal edge 133 of the first and second legs 132,134.

At the same time, the fourth angled surfaces 148 of the protrusions 138 contact the first angled surface 135 of the rear edge 154, and the second angled surface 138 contacts the third angled surface 139.

In particular, the contact between the second angled surface 138 and the third angled surface 139 helps guiding the cleat 220 into the correct orientation during engagement.

As the user pushes the foot downwards in order to achieve engagement of the cleat 220 into the pedal body 130, the contact between angled surfaces 148,135 and 138,139 causes the cleat 220 itself to move forward.

Due to that, legs 132,134 flex outwards, temporarily increasing the width of the gap 152.

The cleat 220 therefore reaches the engagement position shown in FIGS. 15, 16, with an audible "click" sound, in which the engagement surfaces 237 of the protrusions 238 contact the lower surface of the rear edge 154 of the rear portion 124.

In this condition, the latch member 190 is engaged in the groove 236.

Figure 19:
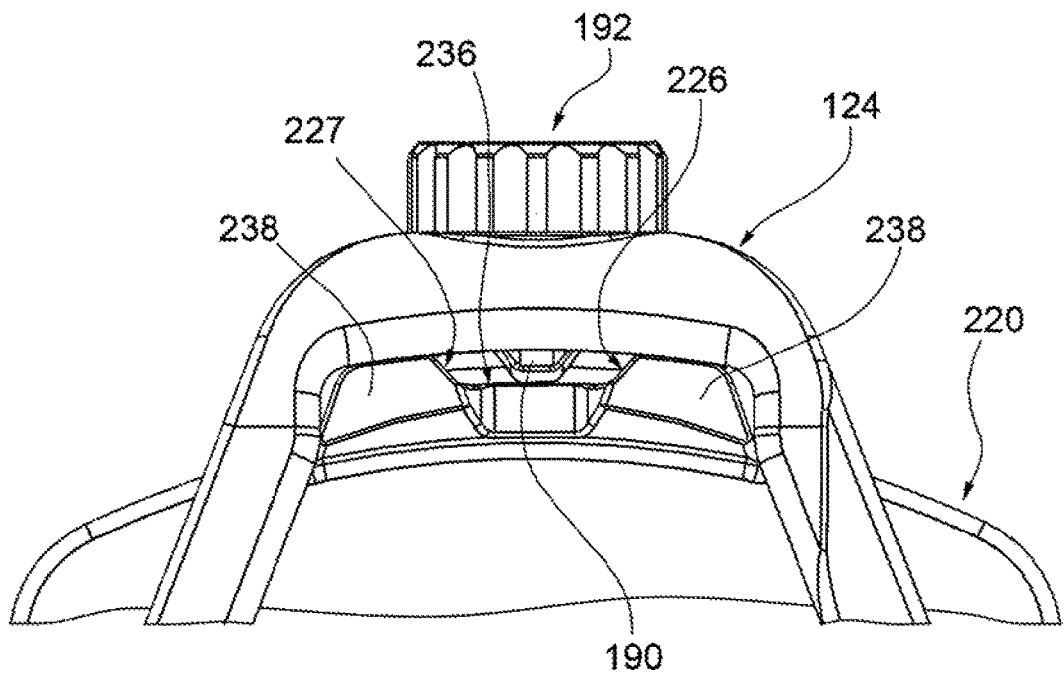
FIG. 19 is a bottom close up view of the pedal with the cleat engaged and in the middle of its rotational cleat float.

As shown in FIG. 19, a certain rotational cleat float is guaranteed by the gap existing between the external surface 191 of the latch member 190 and the lateral angled surfaces 226,227 of the protrusions 238.

The cleat float can therefore be changed, according to user's specific requirements, by modifying the external surface 191 and/or the lateral angled surfaces 226,227.

The engagement force of the cleat 220 into the pedal body 130 will vary depending on the body material used, on the dimensions of the legs 132,134, and on the dimensions of the cleat 220.

Also, the rotational float can be varied depending on the cleat that the rider uses, and could range from no float up to 30 degrees of float.

Figure 20:
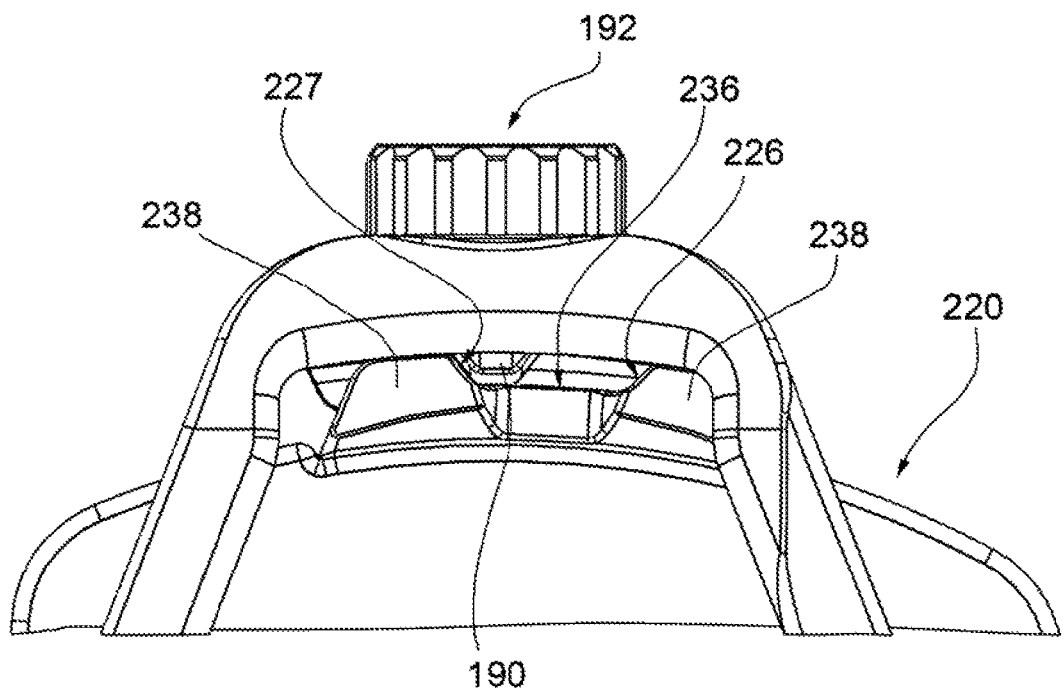
FIG. 20 is a bottom close up view of the pedal shown in FIG. 19, with the cleat rotated to the end of its outward rotational float.
Figure 21:
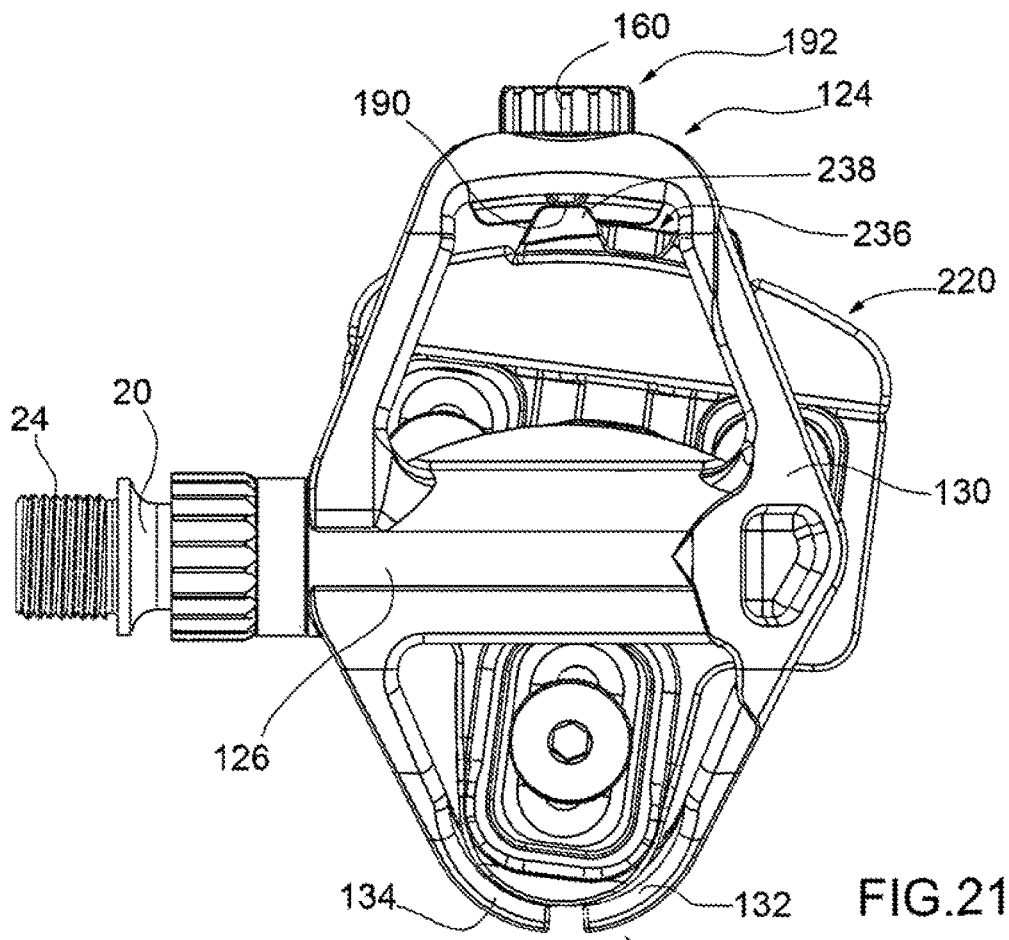
FIG. 21 is a bottom view of the pedal during disengagement if the cleat.

Disengagement of the cleat 220 from the pedal body 130 is shown in FIGS. 20, 21.

By turning cleat 220 beyond its float, the latch member 190 forces the cleat 220 itself to move forwards.

Figure 23:
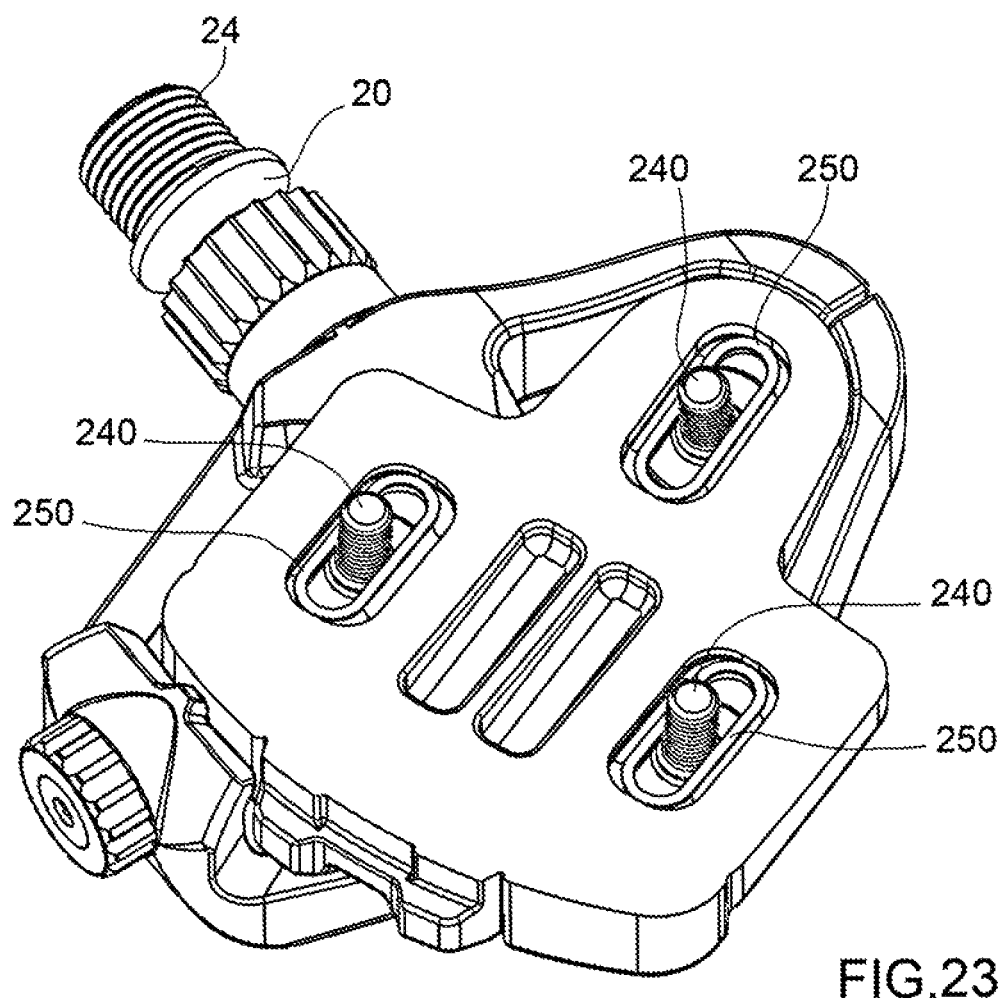
FIG. 23 is a perspective view of the pedal with the cleat rotated enough to be in a released position.

This causes the legs 132,134 to flex outwards, allowing one of the protrusions 238 of the cleat 220 to move beyond the latch member 190, reaching therefore the condition shown in FIG. 23.

The release force which must be exerted by the rider can be accurately adjusted by the adjustment means 192.

The condition of zero release force is shown in FIG. 10.

In this condition, the latch member 190 is fully retracted inside the seat 194, and it offers no resistance to the rotation of the cleat 220.

In particular, it offers no obstruction to the movement of the protrusions 238 of the cleat 220.

This condition could be helpful for riders having weak knees or other physical issues or reasons why they would prefer an extremely low release force.

In FIG. 11 an intermediate condition is shown, in which a certain release force is required to disengage the cleat 220 from the pedal body 130.

The latch member 190 partially comes out from the seat 194, and it must be overtaken by one of the protrusions 238 during release of the cleat 220 from the pedal body 130.

In FIG. 12 an end condition is shown in which the latch member 190 is adjusted fully outward with respect to the seat 194, and the maximum release force is then required to disengage the cleat 220 from the pedal body 130.

Figure 22:
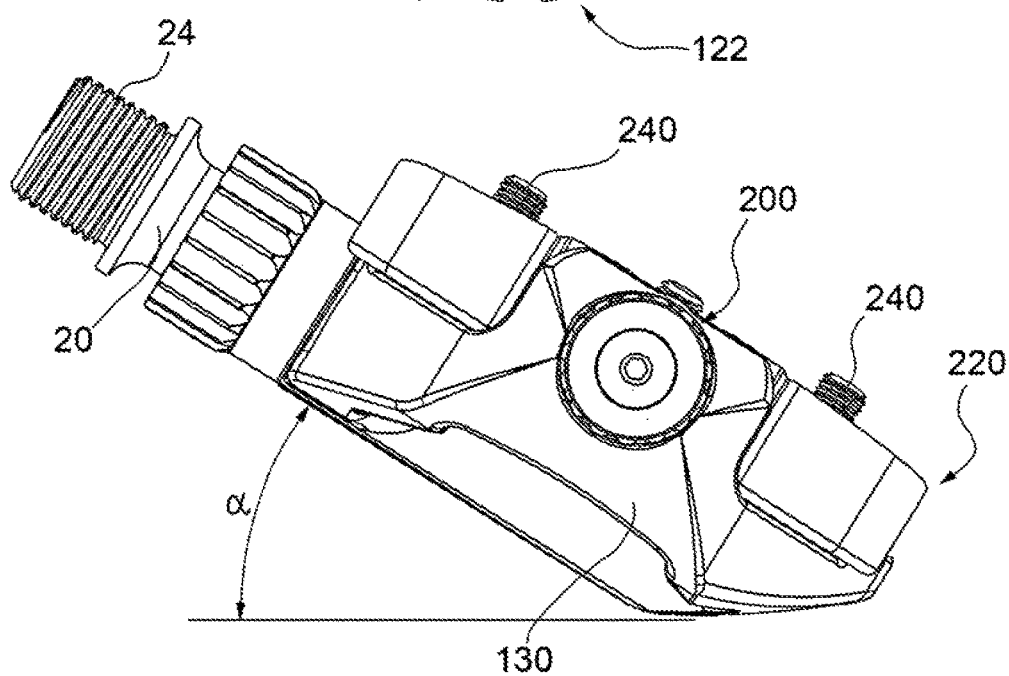
FIG. 22 is a rear view of the pedal at the maximum lean angle that could occur during a steep bicycle turn.

In FIG. 22 a rear view of the pedal 10 is shown in a condition of maximum lean angle that could occur during a steep bicycle turn.

Even if the Q-factor of the pedal 10 according to the invention can be adjusted, the lean angle α of the pedal is bigger compared to existing pedals, allowing the rider to pedal through a steeper turn without the pedal contacting the road.

The configuration of the pedal according to the invention provided a large amount of contact between the cleat 220 and the pedal 10, providing a solid connection between the rider's shoe and the pedal 10.

Thanks to the preferred materials chosen for the various components, pedal 10 is very light, and at the same time robust and reliable.

The upper surface 142 of the pedal body 130 can be made as an integral part of body 130, but a thin plate, for example of stainless steel, could be installed to provide improved wear or float feel.

Figure 24:
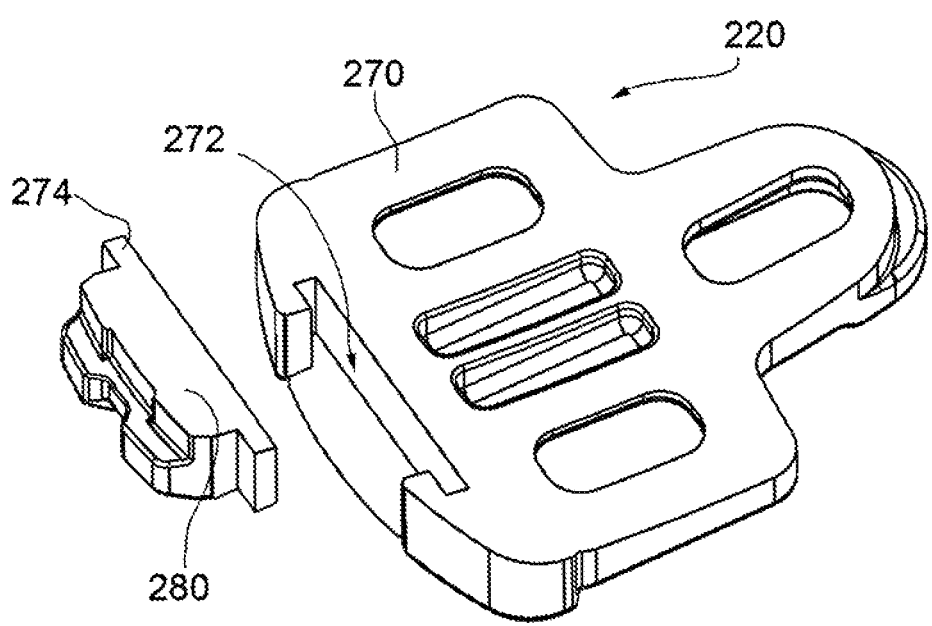
FIG. 24 is an exploded view of another embodiment of the cleat engageable in the pedal according to the invention.

An alternative embodiment of the invention is shown in FIG. 24.

In particular, in this embodiment of the invention the cleat 220 comprises two parts 270,280.

More in detail, the cleat 220 comprises a cleat body 270 and separate rear engagement means 280.

The cleat body 270 comprises a T-shaped seat 272 in which the rear engagement means 280 can be removably engaged.

The rear engagement means 280 comprise a T-shaped appendix 274 engageable in the T-shaped seat 272.

This solution allows the user to modify the rotational float and/or the release force of the cleat, by replacing the rear engagement means 280 with others with different geometrical features.

For example, in the embodiment shown the cleat 220 has less rotational float with respect to the previous embodiment, since the protrusion 238 are closer to each other, and therefore the groove 236 is narrower.

The present invention has been described according to preferred embodiments, but equivalent variants can be devised without departing from the scope of protection offered by the following claims.

What is claimed is:

1. An automatic bicycle pedal assembly, comprising:
a pedal body rotationally connected to a spindle, said pedal body having a front-rear direction and comprising a front portion and a rear portion, and
a cleat provided with a front hook and a rear hook respectively engageable in said front portion and in said rear portion of said pedal body,
said front portion comprising a first flexible leg and a second flexible leg separated by a gap arranged along said front-rear direction and engageable by said front hook of said cleat,
wherein said rear portion of the pedal body comprises an appendix which is not movable with respect to said rear portion and which is substantially perpendicular to said front-rear direction,
wherein said appendix comprises a rear edge which defines a first angled surface and which comprises a rear tooth, the rear tooth protrudes from said rear edge and is arranged along said front-rear direction and defines a second angled surface,
wherein said rear hook of said cleat comprises two protrusions between which a groove is defined,
wherein said groove defines a third angled surface suitable to cooperate with said second angled surface of said rear tooth during engagement of said cleat onto said pedal body,
wherein said protrusions each define a respective fourth angled surface suitable to cooperate with said first angled surface of said rear edge during engagement of said cleat onto said pedal body, so that contact between said second angled surface of said rear tooth and said third angled surface of said groove helps guide said cleat wherein said rear portion comprises a latch member which is selectively slidable within a respective seat along said front-rear direction.

2. The pedal assembly according to claim 1, said latch member comprises an external surface having a ramp profile.

3. The pedal assembly according to claim 1, wherein said latch member is engaged in said groove of said rear hook when said cleat is engaged into said pedal body.

4. The pedal assembly according to claim 1, wherein each of said protrusions comprise respective lateral angled surfaces, which defines said groove suitable to cooperate with said ramp profile of said external surface of said latch member.

* * * * *